United States Patent [19]
Duly

[11] Patent Number: 5,906,694
[45] Date of Patent: May 25, 1999

[54] ULTRASONIC TUBE WELDING AND CUTTING APPARATUS AND METHOD

[75] Inventor: Alan R. Duly, Trumbull, Conn.

[73] Assignee: American Technology, Inc., Shelton, Conn.

[21] Appl. No.: 09/052,669

[22] Filed: Mar. 31, 1998

[51] Int. Cl.⁶ .................................................. B32B 31/18
[52] U.S. Cl. .......................... 156/73.3; 156/251; 156/515; 156/530; 156/580.2; 228/110.1; 228/1.1; 264/445; 425/174.2
[58] Field of Search ................................. 156/73.1, 73.3, 156/250, 251, 510, 515, 530, 580.1, 580.2; 228/110.1, 1.1; 264/442, 443, 445; 425/174.2

[56] References Cited

U.S. PATENT DOCUMENTS

| | | | |
|---|---|---|---|
| 2,568,911 | 9/1951 | Cox et al. | 219/137 R |
| 2,851,580 | 9/1958 | Taylor | 219/68 |
| 4,596,352 | 6/1986 | Knapp | 228/1.1 |
| 4,619,397 | 10/1986 | Urban | 228/111 |
| 4,736,881 | 4/1988 | Niebuhr | 228/1.1 |
| 5,730,832 | 3/1998 | Sato et al. | 156/499 |

*Primary Examiner*—James Sells
*Attorney, Agent, or Firm*—St. Onge Steward Johnston & Reens LLC

[57] ABSTRACT

An ultrasonic apparatus and method for charging a coil with a refrigerant gas is described wherein a tube used to convey the gas into the cooling coil is welded shut on both sides of a cutting line so that gas in the tube cannot escape after the charging step has been completed. Die elements to enable such severing of the tube are described with each having corresponding spaced apart welding surfaces and with one of the elements having a cutting edge between its welding surfaces to cut the tube as its internal wall is sealed with an ultrasonic welder.

6 Claims, 4 Drawing Sheets

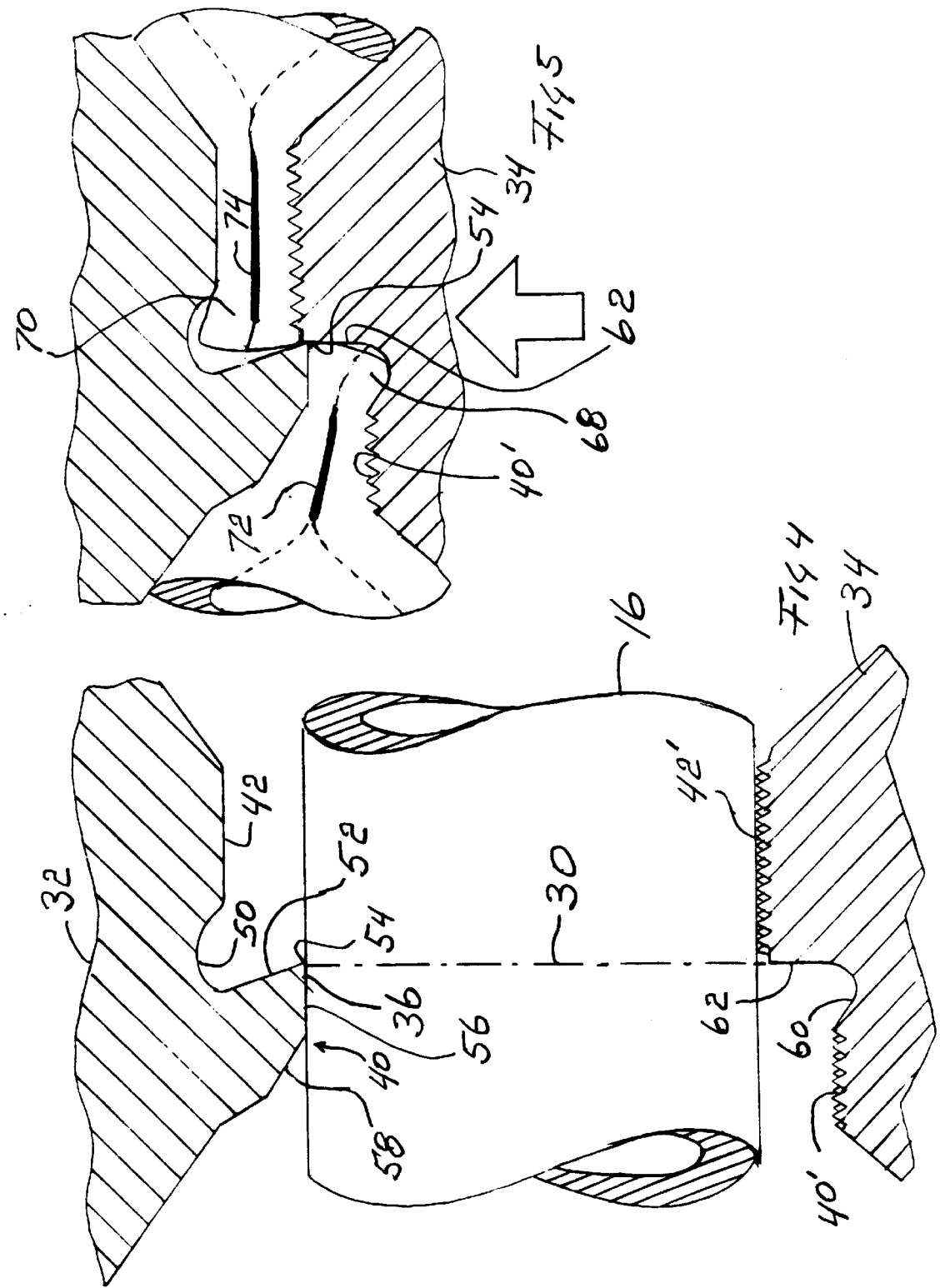

ULTRASONIC TUBE WELDING AND CUTTING APPARATUS AND METHOD

FIELD OF THE INVENTION

This invention relates to the cutting and ultrasonic welding of metal tubes in general and more specifically to the cutting and ultrasonic welding of copper tubes used to hold a refrigerant.

BACKGROUND OF THE INVENTION

Techniques for severing and sealing of metal tubes are well known in the art. See for example the U.S. Pat. No. 2,568,911 wherein a tube is sealed and then severed. In U.S. Pat. No. 2,851,580 a tube is welded closed using a pair of spaced apart electrodes which apply an electric current to seal the tube ends. U.S. Pat. Nos. 4,596,352, 4,619,397 and 4,736,881, see particularly the latter's FIG. 5, teach various methods and apparatuses for joining electric conductors using ultrasonic energy.

During the manufacture of a refrigerator, refrigerant must be forced into a compressor through a thin copper tube. In the prior art an ultrasonic welder was used to ultrasonically cut and seal the copper tube. In such equipment an anvil and a generally cylindrical tip are provided with the tip having a plurality of axially elongate tube welding surfaces distributed around the tip axis. The tip has cutting edges alongside the respective ultrasonic welding surfaces. The cutting edges cooperate with a shearing surface on the anvil to cut a tube after one side of the tube has been squeezed between opposing welding surfaces to seal the tube with an ultrasonic weld.

The ultrasonic welding process creates a tube temperature of about 550° C., which is not a problem with a non-combustible refrigerant gas such as HFC. Hence, a copper tube would be simply welded and cut with an ultrasonic welder as described above and a seal would be made on the refrigerator's side. The severed tube leading to the supply of HFC gas would be left open and some gas permitted to escape. When other combustible refrigerant gases would be used, with ignition temperatures within the range of the temperatures developed during the ultrasonic welding step, ignition problem would arise.

It is an object of the present invention to provide an apparatus and method for cutting a tube and sealing both ends to prevent gas leakage from the cut tube. More specifically, it is an object of the invention to provide a safe apparatus and technique for cutting and welding copper tubes during filling with a combustible refrigerant.

SUMMARY OF THE INVENTION

With a technique in accordance with the invention a tube can be welded on both sides of a cut line in a single operation so that combustible refrigerant gas cannot mix with oxygen to become combustible and very little gas escapes. This is achieved with one method and apparatus in accordance with the invention by providing ultrasonic welding elements in the form of a tip and anvil with which a tube to be worked is initially squeezed so that its internal walls contact each other. The tube is then sealed with ultrasonic welding at spaced apart locations and with a continuous movement of the welding elements subsequently cut along a cut line located between the welded surfaces. The tube can be made from a variety of materials, including copper alloy, some aluminum alloys, and plastic.

It is specifically intended to prevent leakage of combustible gas, but the apparatus and method may be used to prevent leakage of toxic gas or any other types of gases.

As described herein for one set of welding elements, the tip is generally cylindrical and has a plurality of pairs of circumferentially spaced apart axially elongate welding surfaces. One of the welding surfaces in a pair is radially displaced from the other and an elongate cutting edge and a metal receiving pocket are located between them. The anvil is provided with corresponding welding surfaces with a metal receiving pocket and shearing surface between them. The tip and anvil are so located with respect to each other that the cutting edge and shearing surface operatively contact each other with a continuous motion of the tip and anvil during or after the welding surfaces have squeezed and sealed a tube to be cut.

In this manner the tube is effectively sealed at both cut ends as it is cut and little refrigerant gas, if any, is permitted to escape or can be ignited as a result of the ultrasonic welding operation.

It is, therefore, an object of the invention to provide a safe method and apparatus for ultrasonically cutting and welding a tube during the charging of refrigerator cooling system with a refrigerant. It is a further object of the invention to provide an apparatus and method for preventing the escape of a gas into an equipment in which the gas is to be loaded.

These and other objects and advantages of the invention can be understood from the following description of an embodiment of the invention as shown in the drawings.

BRIEF DESCRIPTION OF THE DRAWINGS

FIG. 4 is an enlarged front section view of the apparatus during an initial step of the method of the invention;

FIG. 5 is like view as in FIG. 4 but during the cutting and ultrasonic welding step of the invention.

DETAILED DESCRIPTION OF DRAWINGS

Figure 1:
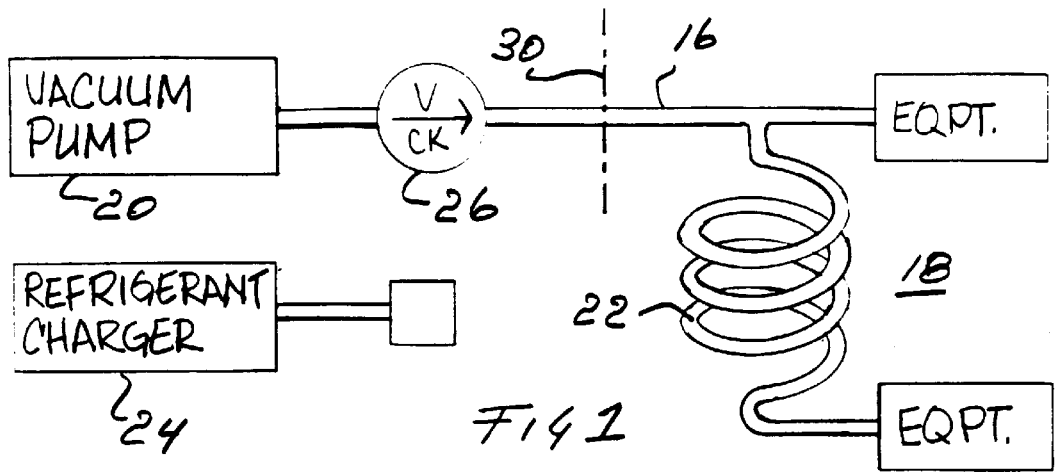
FIG. 1 is a block diagram view of a typical environment in which an apparatus and method in accordance with the invention are practiced.
Figure 2:
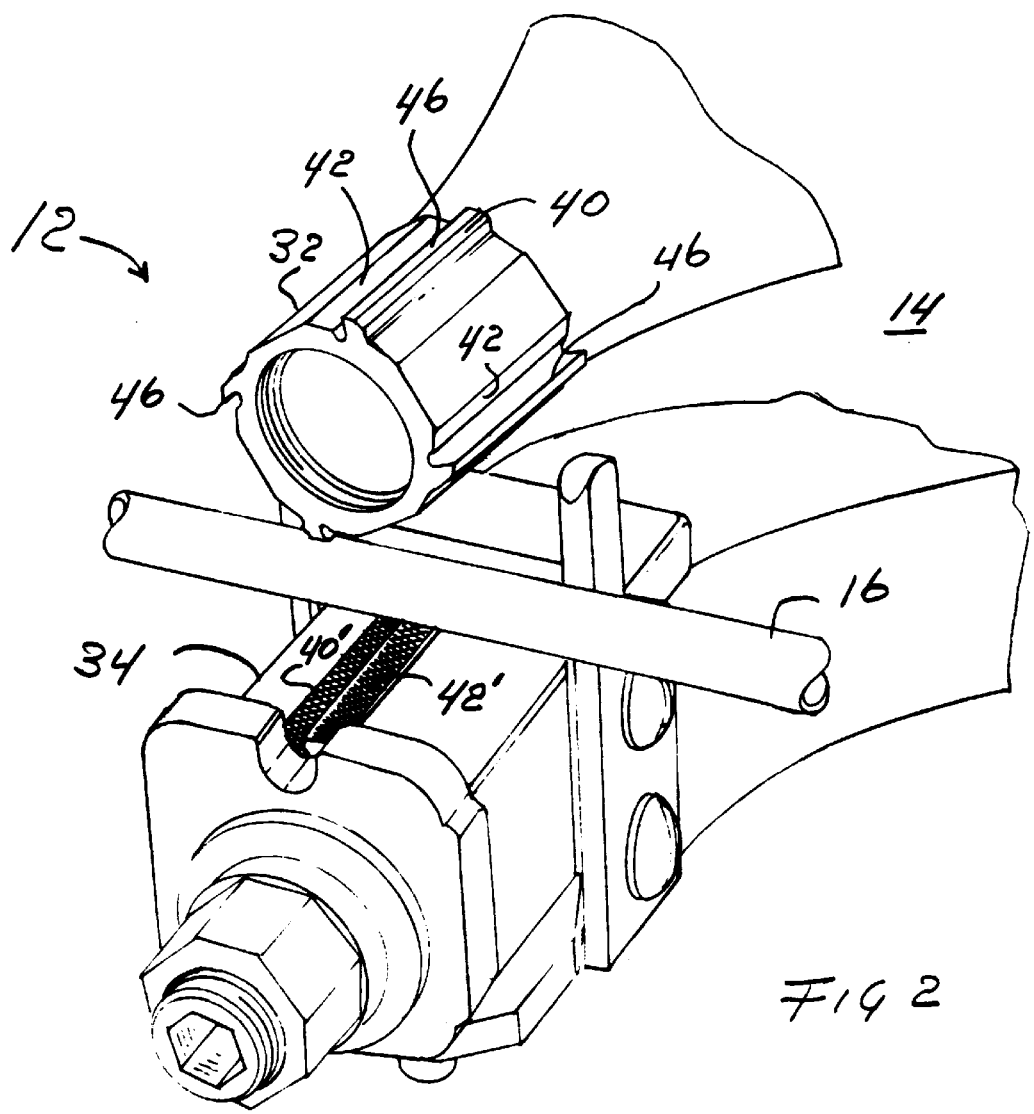
FIG. 2 is a perspective view of the tip and anvil portion of an ultrasonic welding apparatus in accordance with the invention and shown during one step of the method of the invention.

With reference to FIGS. 1 and 2 the working end 12 of an ultrasonic apparatus 14 in accordance with the invention is shown for sealing and cutting of a filler tube 16 leading to the cooling equipment 18 of a refrigerator. This equipment is shown for illustrative purposes only since the invention can be used to weld and cut a variety of different tubes. In the charging of the cooling equipment 18 a vacuum pump 20 is used to at first remove the air from the cooling coil 22 and then enable a charging of the coil 22 with appropriate refrigerant gas from a source 24 through a check valve 26. Once the coil has been charged with refrigerant gas, the tube 16 needs to be cut. In order to minimize the escape of gas it is desired to cut the tube 16 and then ultrasonically weld the tube on both sides of a cut line 30 so that gas is sealed inside the cut tube ends.

As shown in FIG. 2, the tube 16 is placed between ultrasonic welding die elements which typically include a tip 32 and anvil 34 attached to an ultrasonic welder, only part of which is visible in the view of FIG. 2. The tip 32 is mounted for rotation and in alignment with the anvil 34 which is movable towards and away from tip 32. The mechanisms for mounting of the tip 32, moving of the anvil 34 and generating ultrasonic energy are well known in the art and do not form a part of the invention.

The shape of the tip die 32 is formed so that a tube 16 can be squeezed closed and welded and cut while forming welded segments on both sides of the cut. This is achieved by providing a generally cylindrical tip 32 which has, either one or as shown, preferably several pairs of spaced apart elongate welding surfaces 40, 42 located around the tip axis 44 at the periphery of the tip 32. The welding surfaces extend axially on opposite sides of an elongate cutting edge 46 and are disposed to engage corresponding welding surfaces 40' and 42' located on the anvil die 34.

FIGS. 4 and 5 illustrate the shape of the tip and anvil dies 32, 34 with greater detail as well as the welding and cutting steps involved with the apparatus and method of the invention. Each pair of spaced apart welding surfaces 40, 42 is separated by an elongate axially extending metal receiving pocket 50 with an under cutting wall 52 so as to form a sharp circumferentially facing end edge 46. The welding surface 40 has a projecting portion 56 and a recessed segment 58 to accommodate excess tube material produced during its welding and cutting. The projecting portion 56 of the welding surface 40 is vertically displaced from the welding surface 42 by a distance that enhances the cutting and ultrasonic welding operation.

The anvil die element 34 has its welding surface 42' spaced from welding surface 40' with a metal receiving pocket 60 located between them. Surfaces 40' and 42' are knurled to enhance their ability to grip the tube 16. The pocket 60 has a side shearing wall 62 located in alignment with the cutting line 30 and the cutting edge 46. The welding surface 40' is vertically offset from surface 42' by an amount that is commensurate with that between surfaces 40 and 42.

Figure 3:
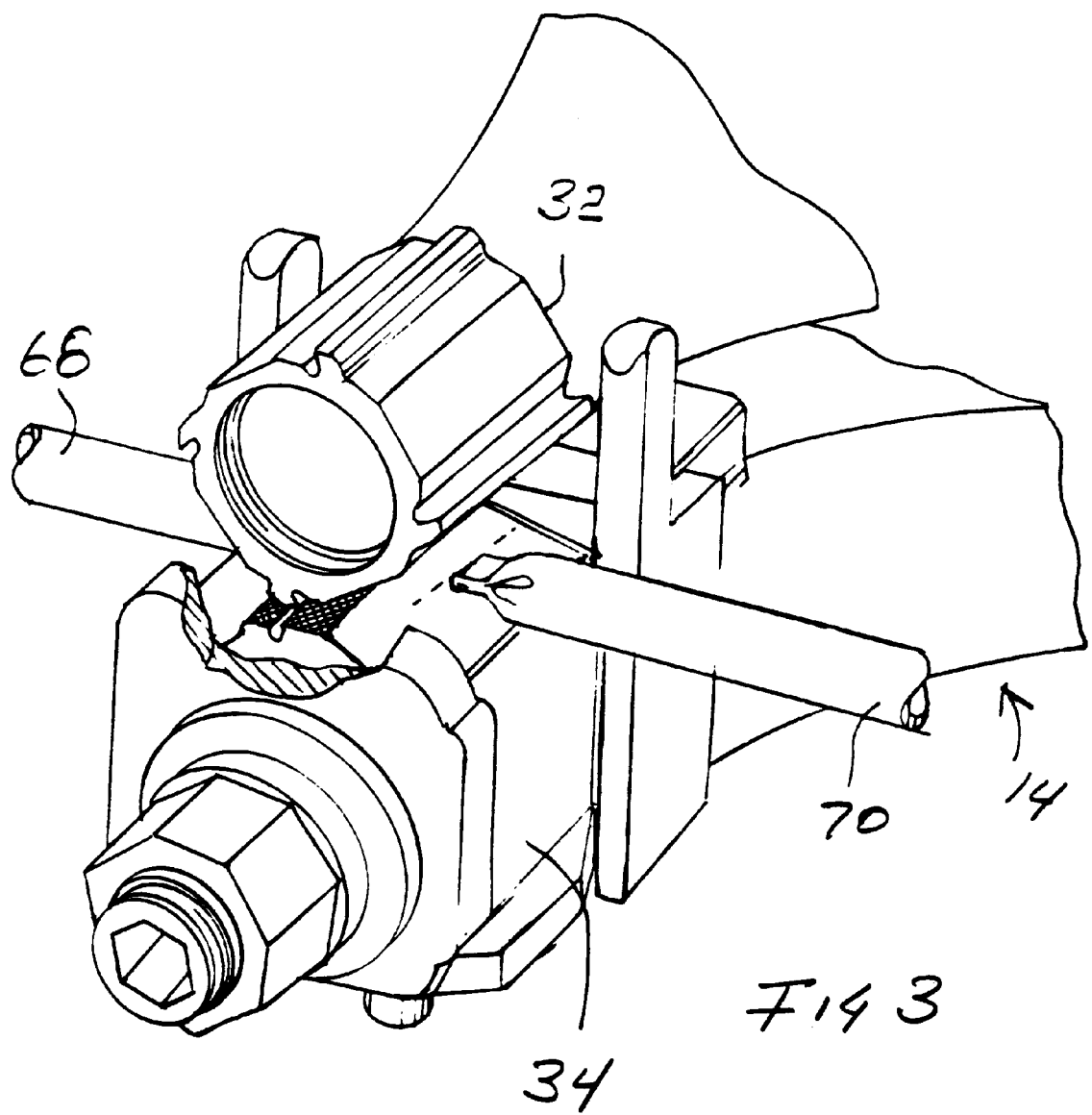
FIG. 3 is a similar view as in FIG. 2 but during a final step of the method of the invention.

During an ultrasonic welding and cutting operation the anvil 34 is initially moved to squeeze the tube 16 until opposite sides of its internal wall 66 contact each other as illustrated in FIG. 5. At this time the ultrasonic energy source inside the equipment 14 is activated and the contacting internal wall surfaces brought into intimate contact sufficient to form a hermetic seal for the tube ends 68, 70 at 72 and 74. The ultrasonic energy is sufficient to achieve such seal. Note how the deformed portions of the tube 16 during the squeezing of the tube can expand into the respective pockets 50 and 60. A complete severing of the tube ends 68, 70 occurs when the edge 54 is driven opposite shear wall 62. After cutting of the tube, the anvil 34 is lowered and the tube ends 68, 70 removed as illustrated in FIG. 3.

Figure 6:
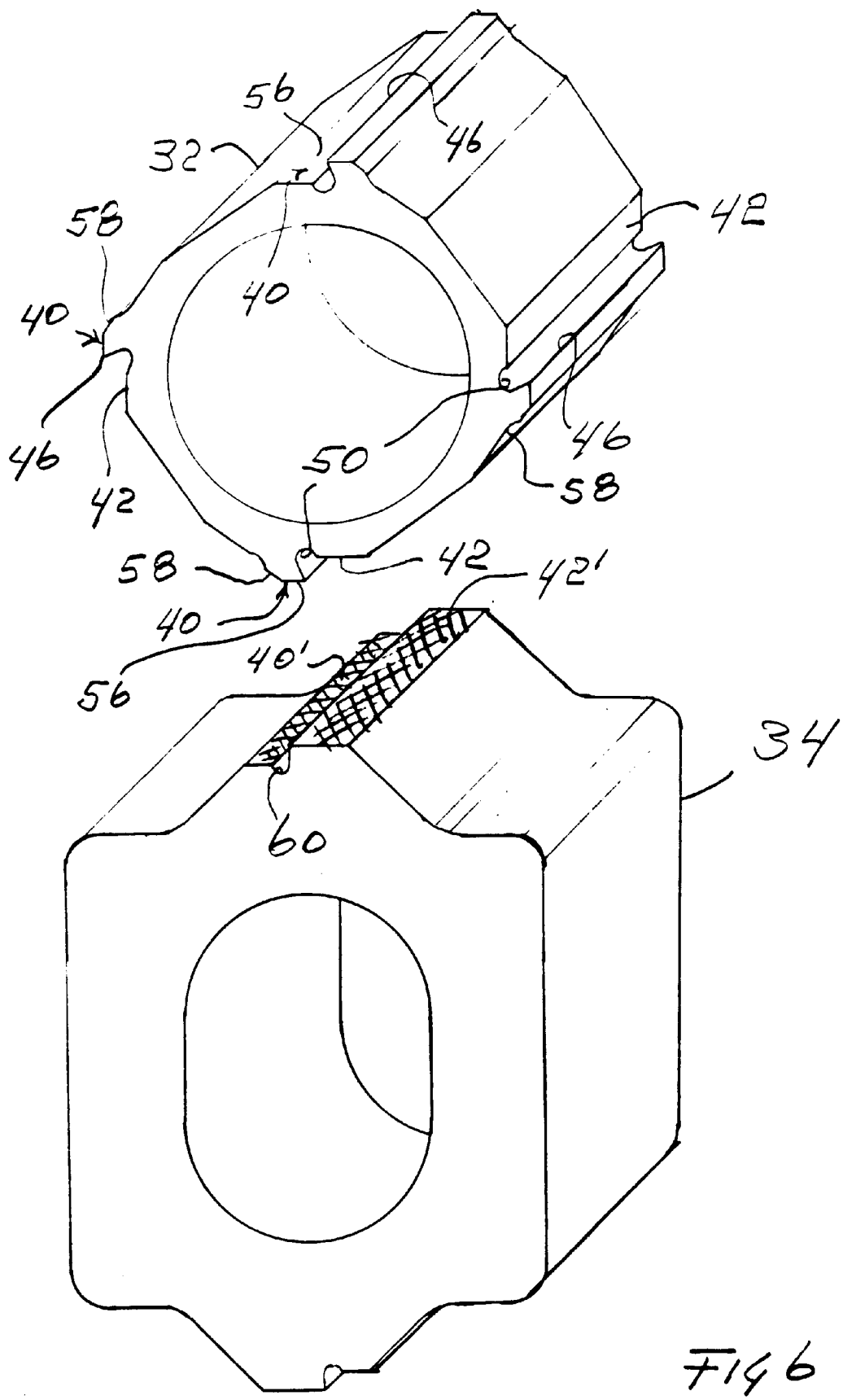
FIG. 6 is an enlarged perspective view of the tip and anvil in accordance with the invention.

FIG. 6 is a perspective view of the individual die elements 32 and 34. The tip 32 has a plurality of pairs of welding surfaces 40, 42, though a single pair could be used. The multiple pairs provide spares that can be brought into use as a particular pair wears out.

Having thus explained an ultrasonic tube welding and cutting apparatus in accordance with the invention its advantages can be appreciated. Variations from the described embodiment can be made by one skilled in the art without departing from the scope of the invention as set forth by the following claims.

What is claimed is:

1. A method for cutting a tube and ultrasonically welding tube ends, comprising the steps of:

placing a tube between an anvil and a tip, each having spaced apart first and second welding surfaces;

advancing the tip and anvil towards each other so as to cause a squeezing of the tube between corresponding welding surfaces so that oppositely located squeezed internal walls of the tube contact each other;

applying ultrasonic energy to the squeezed tube so as to cause said internal walls to form spaced apart hermetic seals for tube portions extending from the welding surfaces;

continuing the advancing step to cut the tube along a cutting line located between the hermetic seals to sever the tube while its severed ends remain sealed; separating the tip and anvil to release the severed ends of the tube portions.

2. The method for cutting and sealing a tube as claimed in claim 1 wherein the advancing step further comprises the step of:

during the advancing step forcing a segment of the tube into a pocket located in alignment with the cutting line so as accommodate severing of the tube.

3. The method as claimed in claim 1 wherein said tip is provided with a plurality of pairs of spaced apart first and second welding surfaces around a periphery of the tip and wherein said tip is rotated about an axis to align a pair of first and second welding surfaces with said first and second welding surfaces on said anvil.

4. A method for charging a cooling coil with a refrigerant gas through a filler tube comprising the steps of:

evacuating air from the coil;

charging the evacuated coil with a refrigerant gas;

placing the tube between a tip and an anvil having corresponding pairs of spaced apart welding surfaces with a cutting edge between welding surfaces;

moving the tip and anvil welding surfaces towards each other to squeeze the tube along a cut line until opposite internal walls of the tube contact each other; and ultrasonically welding the contacting welding surfaces at spaced apart locations and continuing the moving step until the tube is cut along a cut line that is between the spaced apart locations.

5. A tube cutting die for an ultrasonic welder, comprising:

a generally elongate first welding element having a first axially extending peripheral welding surface projecting outwardly from said first welding element, said first welding surface terminating at a circumferential end with an axially extending sharp edge, a second axially extending peripheral welding surface being located alongside, and inwardly from, the sharp edge of the first welding surface by a first desired distance, and a metal receiving pocket being located between the second welding surface and the sharp edge of the first welding surface, said pocket extending inwardly of said second welding surface so as to be able to receive metal of a tube to be first squeezed and then ultrasonically welded with said first and second welding surfaces;

a second welding element having first and second elongate welding surfaces, said first elongate welding surface being disposed alongside and below the second elongate welding surface, and an elongate metal receiving pocket located between the first and second elongate welding surfaces and displaced a second desired distance below the first elongate welding surface, and a shearing surface located alongside of the second elongate welding surface between it and said elongate metal receiving pocket and being disposed to form a tube cutting line with said sharp edge;

said second desired distance being selected so that a tube, located between said first and second welding elements, can be cut and ultrasonically welded on both lateral sides of the sharp edge and said shearing surface when the first and second elements operatively interact to squeeze and cut the tube.

6. A metal tube cutting die for an ultrasonic welder, comprising:

a generally cylindrical welding tip having a plurality of first axially extending and circumferentially distributed peripheral welding surfaces radially projecting outwardly from said tip, said first surfaces each terminating at a circumferential end with an axially extending sharp edge, second axially extending and circumferentially distributed peripheral welding surfaces respectively located alongside, and radially inwardly from, the sharp edges of the first welding surfaces by a first selected distance, and metal receiving pockets located between the second welding surfaces and the sharp edges of the first welding surfaces, said pockets extending radially inwardly of said second welding surfaces so as to be able to receive metal of a tube to be ultrasonically welded with said first and second welding surfaces;

an anvil having first and second elongate welding surfaces, said first elongate welding surface being disposed alongside and below the second elongate welding surface, and an elongate metal receiving pocket, similar to said first metal receiving pocket, and located between the first and second elongate welding surfaces and displaced a second desired distance below the first elongate welding surface, and a shearing surface located alongside of the second elongate welding surface and between it and said elongate metal receiving pocket; said second desired distance being selected commensurate with said first desired distance so that a tube located between said tip and anvil can be cut and ultrasonically welded on both sides of a sharp edge and said shearing surface when these operatively interact to squeeze and cut the tube.

\* \* \* \* \*